United States Patent [19]

Morishita et al.

[11] Patent Number: 4,808,871
[45] Date of Patent: Feb. 28, 1989

[54] DRAINING DEVICE FOR A ROTATING ELECTRIC MACHINE

[75] Inventors: Akira Morishita; Satoru Suzuki; Tatsuo Yabe, all of Himeji, Japan

[73] Assignee: Mitsubishi Denki Kabushiki Kaisha, Tokyo, Japan

[21] Appl. No.: 109,513

[22] Filed: Oct. 19, 1987

[30] Foreign Application Priority Data

Oct. 24, 1986 [JP] Japan ................. 61-254216

[51] Int. Cl.⁴ ............................................. H02K 5/22
[52] U.S. Cl. .................................... 310/89; 310/43
[58] Field of Search ......................................... 310/89

[56] References Cited

U.S. PATENT DOCUMENTS 4,491,754 1/1985 Gotoh ................... 310/43

FOREIGN PATENT DOCUMENTS 56-20527 5/1981 Japan .
59-28262 2/1984 Japan .
60-18653 2/1985 Japan .
62-2906 1/1987 Japan ........................ 310/89

Primary Examiner—Peter S. Wong
Assistant Examiner—D. L. Rebsch
Attorney, Agent, or Firm—Oblon, Fisher, Spivak, McClelland & Maier

[57] ABSTRACT

A draining hole formed in the rear bracket of a rotating electric machined is covered by a molded body which is provided with a draining passage and a through hole, the molded body being supported by a supporting piece fitted onto the outer surface of the rear bracket. A tubular body made of an elastic material is assembled with the molded body, to communicate the through hole with the inner bore of the tubular body.

6 Claims, 3 Drawing Sheets

DRAINING DEVICE FOR A ROTATING ELECTRIC MACHINE

BACKGROUND OF THE INVENTION

1. Field of the Invention

The present invention relates to a draining device for a rotating electric machine which is used for a starter, for instance, with the engine of an automobile.

2. Discussion of the Background

FIGS. 5a to 5d show a conventional draining device for a starter disclosed in, for instance, Japanese Unexamined Utility Model Publication No. 18653/1985. In FIG. 5, reference numeral 1 designates a rear bracket in a d.c. motor for a starter, numeral 2 designates a draining hole formed in the rear bracket 1, numerals 3a, 3b respectively designate bolt holders attached onto the outer circumferential wall of the rear bracket 1 at positions opposing to each other and for supporting bolts (not shown) Each of the bolt holders is prepared by punching and pressing a soft steel shaft, and they are firmly attached to the rear bracket by means of projection welding. Reference numerals 4 indicate the locations where projection welding is carried out. The holder 3b has an extension which forms a supporting piece 5 having a U-shape in cross section which covers the draining hole 2 in bridge form.

In the draining device constructed as above-mentioned, water is discharged through the draining hole 2 in the rear bracket 1 even though it enters the d.c. motor. On the other hand, invasion of dust or muddy water into the rear bracket 1 through the draining hole 2 is blocked because the draining hole 2 is covered by the supporting piece 5 in the bridge form.

In the conventional starter, although water splashed from the direction just below the rear bracket 1 is blocked by the supporting piece 5 and the water does not enter into the bracket 1 through the draining hole 2, there is a possibility that water enters into the rear bracket 1 through the draining hole 2 when the water is splashed upwardly at an angle with respect to the vertical center line of the d.c. motor, as indicated by arrow marks in FIG. 5d. Thus, the brushes and brush holders become rusty due to the water staying in the rear bracket 1, whereby there is caused a faulty sliding movement between the brushes and commutator.

SUMMARY OF THE INVENTION

It is an object of the present invention to provide a draining device for a rotating electric machine capable of blocking water from the interior of the machine through the draining device, if water is splashed into the machine at any angle.

The foregoing and the other objects of the present invention have been attained by providing a draining device for a rotating electric machine comprising a rotary electric machine having a rear bracket, a draining hole formed in the rear bracket, and a supporting piece fitted onto the outer surface of the rear bracket to cover the drain hole in a bridge form, the draining device being characterized by comprising a molded body which is provided with a draining passage and a through hole in the draining passage and which is adapted to be inserted in a space formed between the supporting piece and the outer surface of the rear bracket so as to be in close-contact with the outer surface and to cover the draining hole, and a tubular body made of an elastic material which is adapted to be assembled with the molded body to communicate the through hole with the inner bore of the tubular body.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

A preferred embodiment of the present invention will now be described with reference to the drawings.

Figure 1:
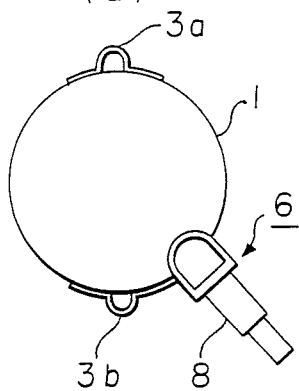
FIGS. 1a and 1b are respectively a front view and a side view showing an embodiment of the draining device for a rotating electric machine according to the present invention.
Figure 1:
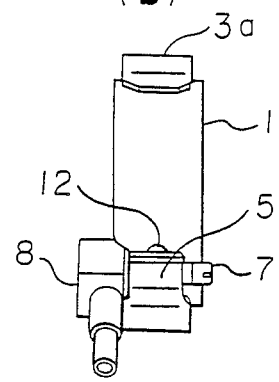

FIGS. 1a and 1b show an embodiment of the draining device according to the present invention, wherein reference numerals 1-5 designate the same parts as in the conventional device shown in FIG. 5, and therefore, description of these parts is omitted.

Figure 2:
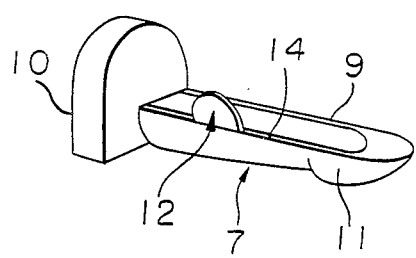
FIGS. 2a, 2b and 2c are respectively a perspective view, a front view and a bottom view showing a molded body for the draining device shown in FIGS. 1a and 1b.
Figure 2:
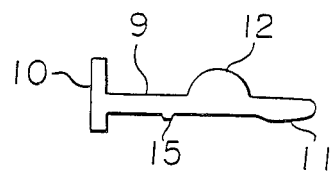
Figure 2:
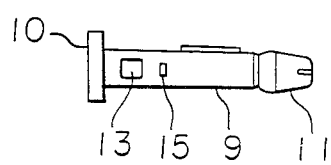

A draining device 6 comprises a molded body 7 and a tubular body 8. The molded body 7 is a one-piece product made of an elastic resinous material such as nylon which consists generally of a trunk portion 9 which is formed by cutting a cylinder in half in the longitudinal direction, an enlarged head portion 10 formed at one end of the trunk 9 and a top portion 11 at the other end, the top portion 11 having a diameter slightly greater than that of the trunk portion 9 and having a tapered edge, as shown in FIGS. 2a, 2b and 2c. The molded body 7 also has a thin-walled semicircular ear portion 12 extending from an edge of the trunk portion 9, a through hole 13 formed at the bottom of the trunk 9 to be communicated with a draining passage 14 formed in the bottom of the trunk portion 9 and a projection 15 formed at the lower part of the trunk portion 9.

Figure 3:
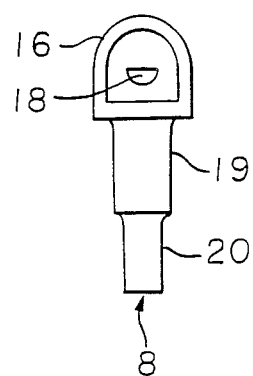
FIGS. 3a and 3b are respectively a front view and a longitudinal cross-sectional view of a tubular body for the draining device in the first embodiment of the present invention.
Figure 3:
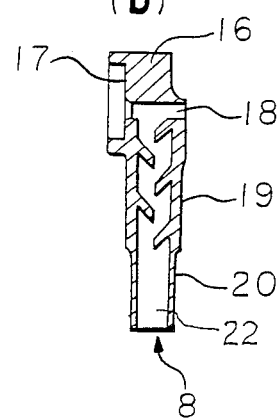

FIGS. 3a and 3b show the construction of the tubular body 8 in detail. The tubular body 8 comprises a head portion 16 having a recess 17 at its one side in which the head portion 10 of the molded body 7 is to be fitted, and a curved portion at the other side, which is formed so as to correspond to the shape of the curved portion of the rear bracket. The tubular body is also provided with a lateral hole 18, into which the trunk portion 9 of the molded body 7 is inserted and a main body 19 having an inner bore 22 extending in the longitudinal direction in which a labyrinth structure consisting of five stages of projections are formed integrally with the inner wall of the main body 19. A very thin-walled flexible tubular portion 20 is formed at the lower portion of the main body which is opposite the head portion 19. The tubular body 8 is made of an elastic material such as rubber.

Figure 4:
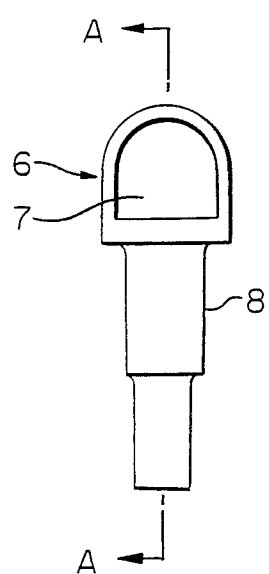
FIGS. 4a and 4b are respectively a front view and a cross-sectional view taken along a line A—A of the draining device in which the molded body and the tubular body are assembled.
Figure 4:
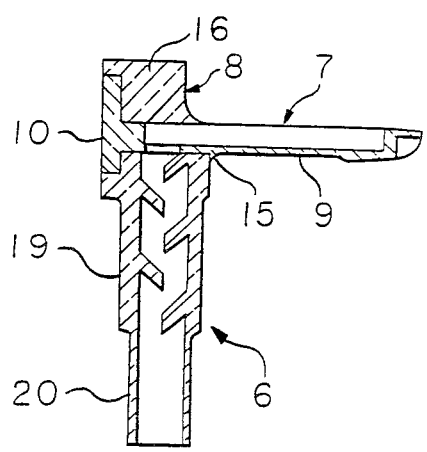
Figure 5A:
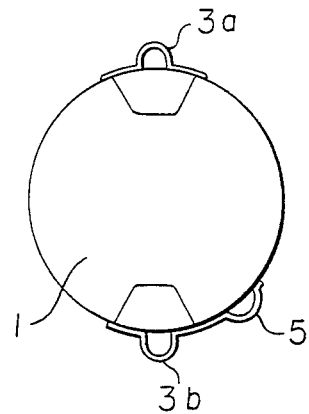
FIGS. 5a, 5b, 5c and 5d are respectively a front view, a bottom view, an elevation view partly broken and a side view showing a conventional draining device for a rotating electric machine.
Figure 5C:
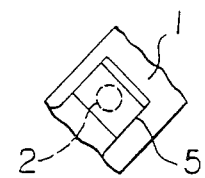
Figure 5B:
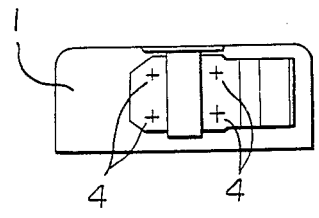
Figure 5D:
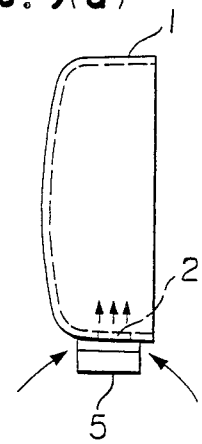

The molded body 7 is inserted into the lateral hole 18 of the tubular body 8 so as to receive the head portion 10 in the recess 17, so that the draining device 6 is fabricated as shown in FIGS. 4a and 4b. The draining device 6 is fitted to the rear bracket by forcibly inserting the molded body 7 in a space formed between the outer surface of the rear bracket 1 and the supporting piece 5. In this case, a certain error in dimension which may result in the spacing between the rear bracket 1 and the supporting piece 5 due to errors in manufacturing these parts can be compensated for because the molded body 7 is made of an elastic material. Further, the work necessary for inserting the molded body 7 can be easily carried out. It is preferable that the length of the trunk portion 9 extending from the projection 15 formed at the lower part of the molded body 7 to the top portion 11 is substantially equal to the width of the supporting piece 5, whereby the molded body 7 can be certainly secured by the supporting piece 5. Also, the curved portion of the head portion 10 is fitted to the curved portion of the rear bracket. When the molded body 7 is inserted in the supporting piece 5, the thin-walled semicircular ear portion 12 is forcibly inserted in a gap formed between an open end of the supporting piece 5 and outer surface of the rear bracket 1. Accordingly, the draining hole 2 of the rear bracket 1 is entirely covered by the molded body 7. The thin-walled tubular portion 20 formed at the lower part of the tubular body 8 is flexible in each direction, depending on water splashed strongly from the downward direction to thereby prevent the water from invasion. Further, since there is the labyrinth structure in the inner bore of the tubular body 8, the spray of the water from the direction just below the rear bracket can be blocked.

Thus, the draining device 6 constituted by the molded body 7 and the tubular body 8 prevents water from entering in the draining hole 2 even though the water is strongly splashed from every direction. On the other hand, water which may enter the d.c. motor from the other portions is discharged through the draining hole 2 via the draining passage 14 of the molded body 7 and the inner bore of the tubular body 8.

COMPARATIVE EXAMPLE

A draining device according to the present invention and a draining device as shown in FIG. 5 were prepared and were respectively fitted to a d.c. motor having the same construction. A 5% salt water solution was splashed from the lower direction of the motor three times a day. As a result, it was found that in the later case, the salt water entered the rear bracket 1 to cause faulty sliding movement between brushes and brush holders in the rear bracket 1. On the other hand, there was found no invasion of the salt water into the rear bracket 1 and the condition of brushes and brush holders was good.

The draining device of the present invention comprises the molded body and the tubular body assembled together by inserting the molded body into the lateral hole of the tubular body, the molded body being inserted in the space between the outer surface of the rear bracket and the supporting piece to surround the draining hole of the rear bracket. Accordingly, invasion of water into the rear bracket through the draining hole can be prevented even though a large amount of water is splashed to the rear bracket from any direction of the rear bracket.

Obviously, numerous modifications and variations of the present invention are possible in light of the above teachings. It is therefore to be understood that within the scope of the appended claims, the invention may be practiced otherwise than as specifically described herein.

What is claimed is:

1. A draining device for a rotating electric machine comprising:
   a rotating electric machine having a rear bracket, a draining hole formed in the outer surface of the rear bracket, and a supporting piece fitted onto said outer surface of the rear bracket to cover said drain hole in a bridge form,
   said draining device comprising:
   a molded body which is provided with a draining passage and a through hole in a wall portion of said draining passage and which is adapted to be inserted in a space formed between said supporting piece and said outer surface of the rear bracket so as to be in closecontact with said outer surface and to cover said draining hole, and
   a tubular body having an inner bore and made of an elastic material which is assembled with said molded body to communicate said through hole with said inner bore of the tubular body, said tubular body having a lateral hole formed therein within which is positioned said molded body.

2. The draining device according to claim 1, said inner bore of the tubular body has a labyrinth structure.

3. The draining device according to claim 1, wherein said tubular body has a thin-walled lower portion.

4. The draining device according to claim 1, wherein said molded body is made of an elastic material.

5. The draining device according to claim 1, wherein said molded body is connected to said tubular body by inserting the molded body into a lateral hole formed in said tubular body.

6. The draining device according to claim 1, wherein said molded body includes a recess formed therein and wherein said tubular body includes a head portion positioned within said recess.

* * * * *